Oct. 18, 1938. N. MANSFIELD 2,133,898
INSECTICIDE APPLICATOR
Filed April 6, 1936 3 Sheets-Sheet 1

Inventor:
Newton Mansfield,
By Spear Donaldson + Hall
Attorneys.

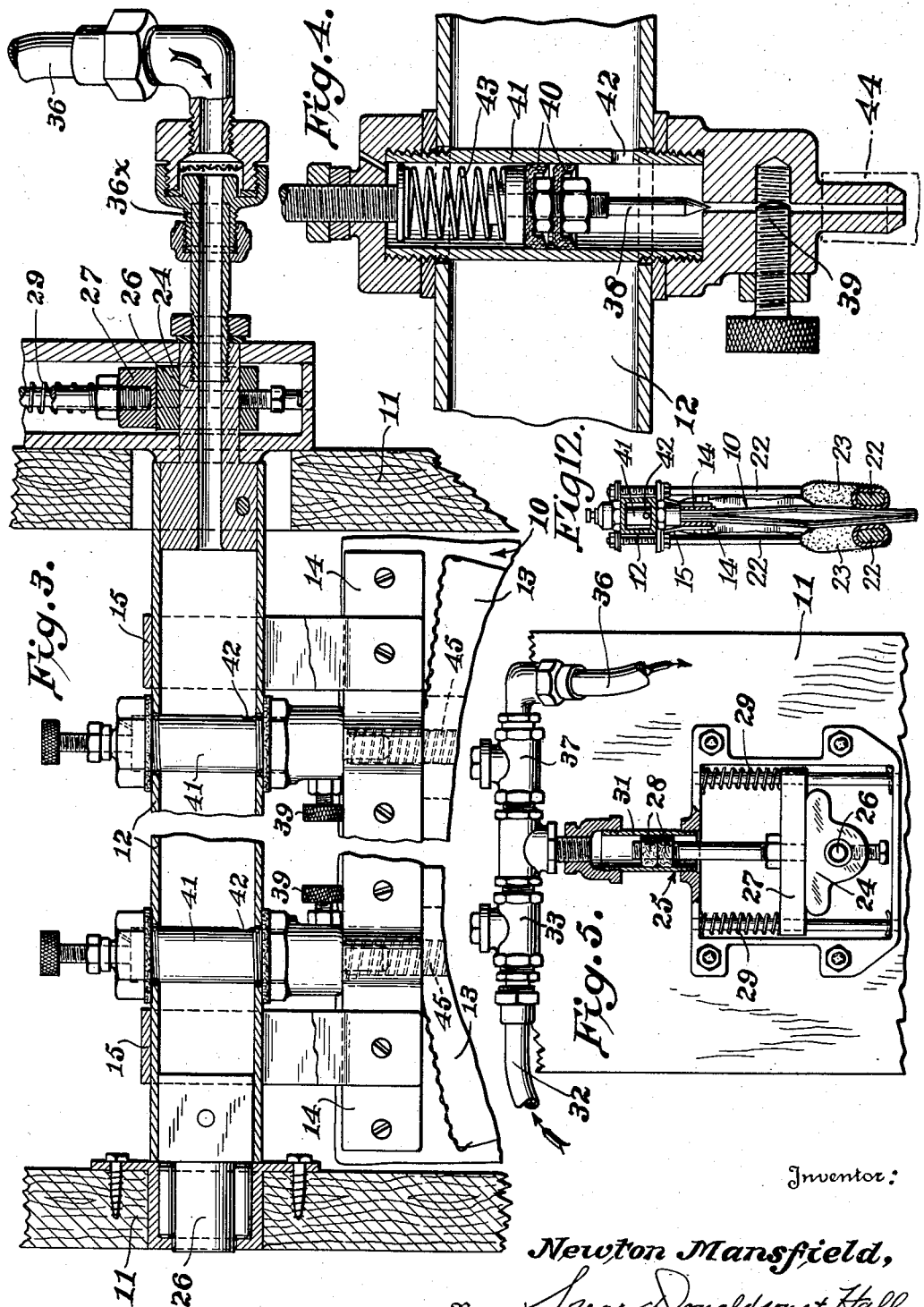

Oct. 18, 1938. N. MANSFIELD 2,133,898
INSECTICIDE APPLICATOR
Filed April 6, 1936 3 Sheets-Sheet 3
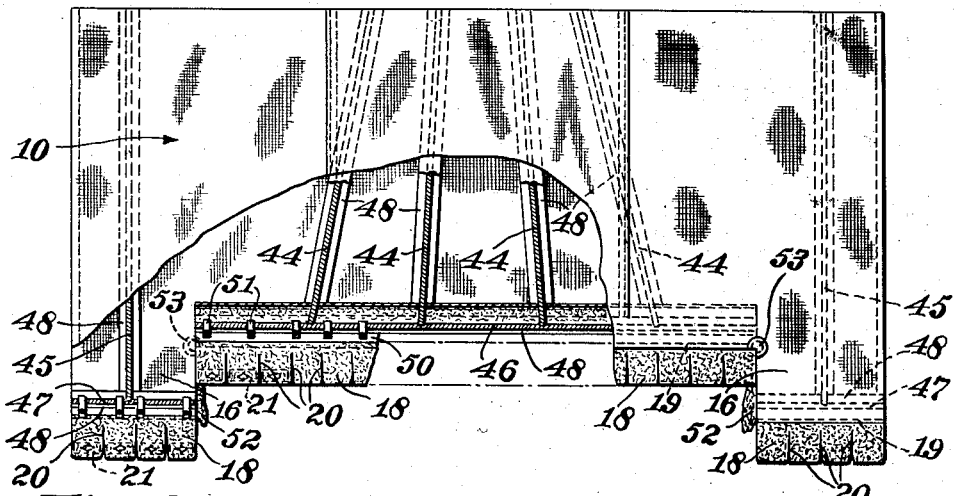
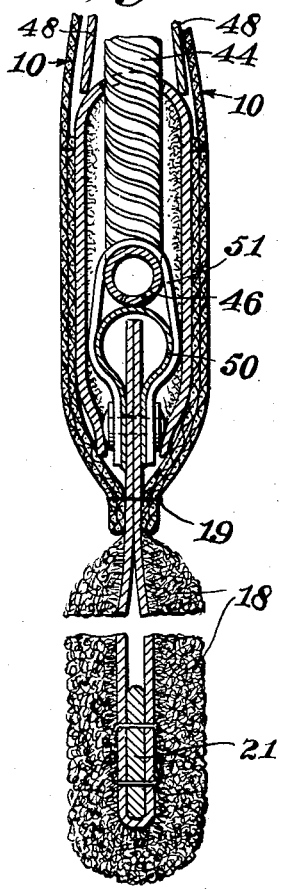
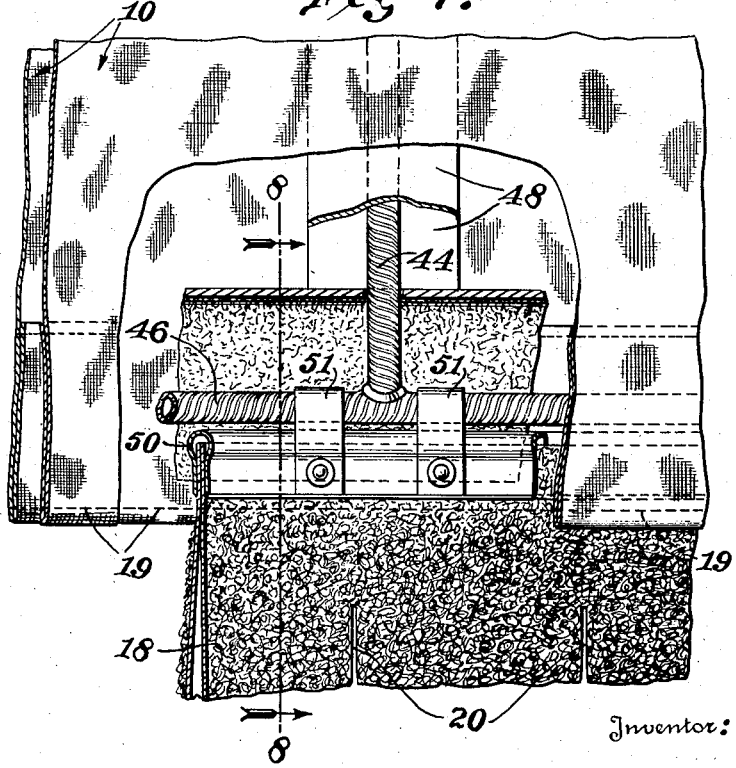
Inventor:
Newton Mansfield,
By Spear Donaldson + Hall
Attorneys Patented Oct. 18, 1938

2,133,898

UNITED STATES PATENT OFFICE 2,133,898

INSECTICIDE APPLICATOR

Newton Mansfield, Ashland, Ohio

Application April 6, 1936, Serial No. 73,021

19 Claims. (Cl. 119—157)

This invention relates to insecticide applicators and more particularly to apparatus by which an animal may apply liquid insecticide to itself. A primary purpose of the invention is to improve upon the apparatuses disclosed in Patents 1,999,122 and 1,999,123 granted to Clark and Mansfield on April 23, 1935.

An object of the invention is to supply insecticide in accordance with the demand and thereby prevent waste while assuring an adequate dose.

Another object is to effect as nearly as possible an application of insecticide to the entire surface of an animal.

Another object is to distribute insecticide uniformly over the wiped surface of an animal.

Another object is to supply insecticide directly to the wiping portion of the applicator.

The detailed nature of these objects and other objects will be apparent from the following description.

In the drawings showing a preferred embodiment of the invention:

Figure 3 is an elevation partly in section, showing principally the supporting means for the applicator.

Figure 4 is an enlarged sectional view of one of the feed valves.

Figure 5 is an elevation of the pump, part being broken away to show the details.

Figure 6 is an elevation of the applicator distended and with part broken away to show the details of construction.

Figure 7 is an enlarged fragmentary view of the lower portion of the applicator.

Figure 8 is a section on the line 8—8 of Figure 7.

Figure 12 is a vertical sectional view taken on line 12—12 of Figure 1 with some of the parts shown in elevation.

Figure 1:
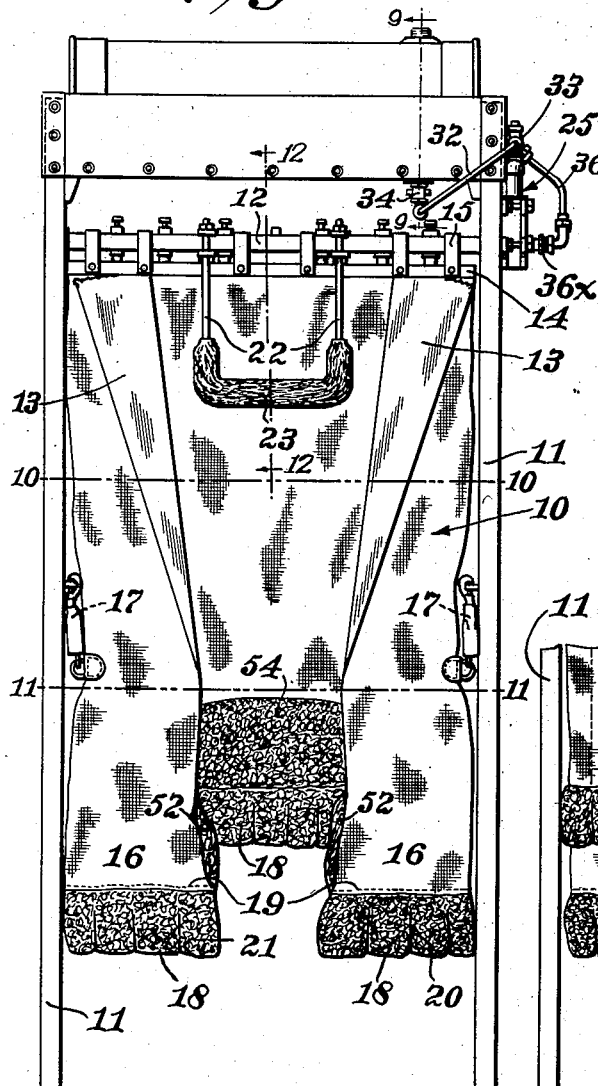
Figure 1 is an elevation of one side of the apparatus.
Figure 9:
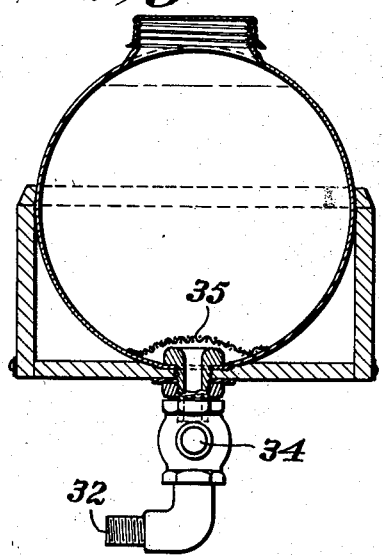
Figure 9 is a section through the reservoir on line 9—9 of Figure 1.
Figure 2:
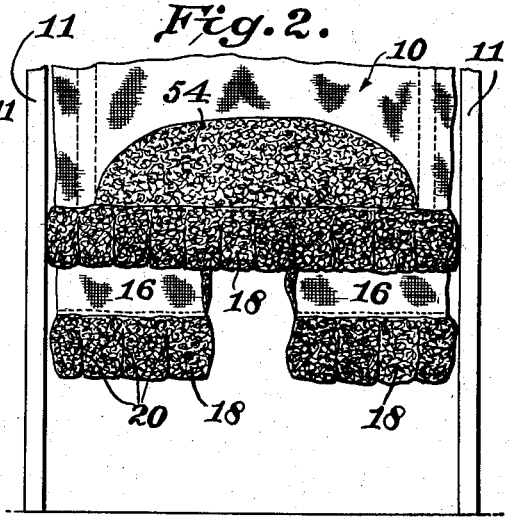
Figure 2 is an elevation of the lower parts of the applicator from the side opposite from Figure 1.

The applicator 10 is suspended within the opening of frame 11, from the tubular member 12 pivotally mounted in the frame. Preferably, the applicator is made of heavy canvas. This applicator is of double thickness and is folded across its width so as to form a vertical plait. As best shown in Fig. 1 the upper part of the innermost folds of the applicator are turned outwardly upon the applicator so as to form lapels 13. These lapels permit the lower part of the plait to open up more freely and thereby more readily spread around an animal's body. To retain the applicator in this folded shape and to support it across the frame opening, it is clamped at its top edge between clamping bars 14. These bars are suspended from the tubular member 12 by hangers 15.

The side portions 16 of the applicator are longer than the central portion thereof, so that these side portions descend closer to the ground. The long side portions form the outermost folds of the plaited applicator. The vertical sides of the applicator at a point above the lowermost edge, are connected to the frame through springs 17. To prevent entanglement with an animal these springs 17 are preferably sheathed as by leather tubes. By attaching the springs 17 to the applicator intermediate the height thereof, the lower part of the applicator is free to more fully contact the animal's body as will hereinafter be noted.

Secured to the lower edge of the applicator are wiping pads 18. These may be made of sheep skin with the wool unremoved, the wool being outward. The pads extend upwardly between the two thicknesses of the applicator and depend below the lower edge of the applicator to apply insecticide to a passing animal. The applicator and pads may be held together by stitching 19. The lower parts of these wiping pads may be subdivided by vertical cuts 20 to form small individual wiping pads along the lowermost edge. Within each of these small individual wiping pads may be secured weights 21 for applying greater pressure against an animal.

It is preferable that the tubular member 12 be of square cross section as the hangers 15 supporting the applicator will then tend to turn the tubular member 12 upon movement of the applicator by a passing animal. To assure an adequate pivoting movement of the tubular member 12, arms 22 affixed thereto and extending downwardly along opposite sides of the applicator, may be provided. To prevent excessive wear upon the applicator the arms 22 may be provided with covering 23. Outward movement of the applicator in either direction will be transmitted through these arms 22 to the tubular member 12 and cause it to pivot. To permit the member 12 to pivot it is provided with cylindrical journals 26 lying within the bearings of the side frame members.

Affixed to one end of the tubular member, preferably on the outer side of the frame, is a double acting cam 24. Secured to the frame in operative relation to the cam 24 is a piston pump 25. The cam 24 acts directly upon the crosshead 27 to which is connected the piston 28. Upon pivotal movement of the tubular member in either direction, the piston will be actuated to make a delivery stroke. Springs 29 restore the piston to its initial position.

The inlet to the cylinder 31 of the pump is connected by pipe 32 through a check valve 33 to an insecticide reservoir or tank carried by the frame. If desired, a cock 34 and strainer 35 may be applied to this connection from the reservoir. The outlet from cylinder 31 is connected by pipe 36 through check valve 37 to the tubular member 12. A packed slip-joint 36x in this connection permits pivotal movement of the tubular member. Check valve 33 permits flow of insecticide only to the pump and check valve 37 permits flow of insecticide only away from the pump.

The tubular member is provided with outlets along its length to distribute the insecticide forced therein from the pump, to the applicator. Each of these outlets is controlled by a pressure responsive needle valve 38 and a regulating valve 39. The pressure responsive valve is carried by piston 40 which operates within cylinder 41. This cylinder 41 is sealed within the tubular member 12 and communicates with the tubular member through opening 42. The piston 40 and needle valve are urged to closed position by an adjustable spring 43. Upon a rise of pressure within the tubular member, resulting from the injection therein of insecticide by the pump 25, the several pistons 40 will be forced upwardly and will carry the needle valves off their seats. Insecticide will then flow through the outlets of the tubular member and will cease to flow as soon as the pressure within the member 12 is relieved and the valves 38 return to their seats.

The delivery of insecticide from each of the tubular member outlets may be regulated either by adjusting the tension of spring 43, or by adjusting the regulating valve 39. It will be apparent that a uniform delivery through the several outlets may be accomplished. Delivery occurs only when there is a rise of pressure within the tubular member and since this rise is uniform throughout the tubular member the needle valves will be uniformly responsive. The tendency of the outlet nearest the connection to receive a greater supply of insecticide is in this manner overcome. Furthermore, the needle valves prevent constant flow of insecticide from the tubular member 12 through the delivery outlets.

Leading from the valve controlled outlets of the tubular member 12, are flexible conduits 44 and 45, held in place between the clamping bars 14. The conduits 45 descend to the elongated side portions 16 of the applicator. Connected to the lower ends of the several centrally disposed conduits 44 is the horizontal flexible conduit 46, and connected to each of the conduits 45 is a horizontal flexible conduit 47. The conduits 46 and 47 have openings therealong for the discharge of insecticide. It will be observed that the several conduits 44, 45, 46 and 47 lie between the two folds of the applicator and that at the location of the conduits the applicator may be provided with chafing strips 48 to prevent wear upon the applicator.

It has been noted that the upper parts of the wiping pads 18 extend upwardly between the folds of the applicator. Attached to the upper edges of the wiping pads are binding strips 50 and these strips are connected to the horizontal conduits 46 and 47 by means of straps 51. In this manner the upper edges of the wiping pads are held in close proximity to the discharge tubes 46 and 47 so as to receive insecticide therefrom. Insecticide is distributed upon the binding strips 50 from the conduits 46 and 47, and these binding strips serve to more uniformly distribute the insecticide to the wiping pads. For this reason the binding strips are preferably made of shellacked leather or sheep skin.

To the inner vertical edges of the portions 16 of the applicator may be attached wiping pads 52 similar to the pads 18. These pads 52 ordinarily will receive sufficient insecticide from the adjacent wiping pads 18. Reinforcing pads 53 preferably of leather may be attached to the corners above pads 18 to prevent tearing of the applicator at these points. Wear pads 54 of sheep skin and unremoved wool may be secured to the applicator above its wiping edge and at the places initially contacted by a passing animal.

From the above description it will be obvious that insecticide is delivered directly to the applying portion of the applicator and that any evaporation which might occur is confined to the relatively small area of the wiping pads. Insecticide is delivered only upon actual movement of the applicator by a passing animal. While the applicator remains idle there is no delivery and no loss of insecticide. Even if an animal stands at rest beneath the applicator, there is no delivery of insecticide.

It is important to note that the pump acts automatically to replenish the applicator with an amount of insecticide equal to that removed from the applicator by an animal. If a large animal passes beneath the applicator, a considerable amount of insecticide is removed, but because of the great extent to which the applicator and thereby the pump is moved, a large quantity of insecticide is delivered from the reservoir to the applicator. If a small animal passes beneath the applicator, only a small amount of insecticide is removed therefrom, but because the pump is actuated to only a slight extent, only a small amount of insecticide is delivered from the reservoir. The applicator is in this manner maintained with a uniform and constant supply of insecticide and insecticide is always present within the wiping pads to assure a full dose to a passing animal.

In passing under the applicator, the animal draws the central part of the applicator forward and lifts it upward so as to unfold the plait. In this manner the upper areas of the animal are contacted and wiped. The side portions of the applicator, and especially the elongated portions 16 swing against the sides of the animal to apply insecticide thereto. Due to the motions of the animal and the fact that the portions 16 of the applicator are unrestrained by springs 17 these long portions swing under the passing animal and against its under portions. In this manner nearly the entire surface of the animal is contacted.

Figure 10:
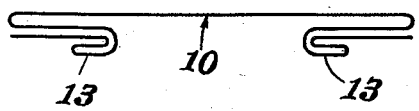
Figure 10 is a diagram in plan to show the general shape of the plaited applicator on line 10—10 of Figure 1 all details of structure being omitted.
Figure 11:
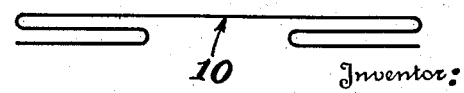
Figure 11 is a diagram similar to Figure 10 but on line 11 of Figure 1.

The general arrangement of plaitings of the applicator is shown in the diagrams Figs. 10 and 11. These are plan views respectively on lines 10—10 and 11—11 of Fig. 1. No details are shown in these views, nor is the double wall form of the applicator there shown, the purpose of these views being merely to show the general lay of the plaits at the points indicated.

The apparatus takes care of varying degrees of delivery in respect to differences in the intervals of time between operations and different demands consequent upon the difference in the sizes of the animals treated, or the variations due to the difference in size between different parts of the same animal. It also takes care of variations in the movement of the animal or animals past the blanket, so that waste is eliminated by varying the supply of insecticide according to the demand. The position of rest of the apparatus may be that when the blanket is hanging vertically, or it may be any position of the rocking member 12 at which the series of valves 38 are closed due to a lowering of pressure in the system resulting from the discharge of fluid into the blanket.

If the blanket be moved from the vertical position of rest the series of valves 38 open and cause a discharge of the liquid, but the valves close automatically when the liquid is discharged, no matter whether the blanket is hanging vertically or not.

An animal places its head and neck under the blanket and moves forward about a foot. This will cause the rotating member 12 to move through an angle of about 15°. This movement will cause the needle valves 38 to open and discharge only about one third of a dose, as a movement of 15° of the rotating tubular member caused the piston to move up only about one third of its travel. The valves then close as the pressure in the tubular member has been relieved. The animal has thus supplied to the wiping member only what it took out to apply the proper dose to its neck and shoulders. It should be borne in mind that the animal is now standing at rest under the blanket and the rotating tubular member has rotated to a position about 15°, also the piston in the pump has moved up in the pump about one third of the way and has come to rest.

After standing with neck and shoulders under the blanket for a period of time, the needle valves being closed, and only about one third of the required dose having been discharged by the pump the animal again moves forward and passes out from under the blanket. This forward movement of the animal causes the rotating tubular member to be further rotated to its extreme angle, viz, 45°—or 30° more than when the animal was standing with neck and shoulders under the blanket. Now this increased angular motion of the rotating tubular member causes the piston in the pump to move up the balance of its stroke. This causes an increased pressure in the tubular member and the needle valves again open and discharge the remaining two thirds of the dose to the wiping pads which have been removed by the after part of the animal's body in passing out from under the blanket.

What is claimed is:

1. In combination in an insecticide distributor, a frame, an applicator of flexible sheet material mounted therein to apply insecticide to a passing animal, an insecticide reservoir, and conduit means from the reservoir to the lower portion of the flexible applicator to deliver insecticide directly to the wiping portion of the applicator, said conduit means including flexible conduit means descending along the flexible applicator.

2. In combination in an insecticide distributor, a frame, an applicator of flexible sheet material mounted therein to apply insecticide to a passing animal, an insecticide reservoir, and conduit means from the reservoir to the lower portion of the flexible applicator to deliver insecticide directly to the wiping portion of the applicator, said conduit means including flexible conduit means descending along the applicator and connecting flexible tubes at the wiping portion of the applicator, extending parallel with the wiping edge of the applicator, and having discharge openings therealong.

3. In combination in an insecticide distributor, a frame, an applicator of flexible material mounted therein to apply insecticide to a passing animal, an insecticide reservoir, and conduit means from the reservoir to the lower portion of the applicator to deliver insecticide directly to the wiping portion of the applicator, said conduit means including tubular means extending across the upper part of the applicator and receiving insecticide from the reservoir, said tubular means having a plurality of outlets spaced therealong, flexible tubes descending along the flexible applicator and leading from each of said outlets to the bottom of the flexible applicator, and flexible tubes connected to the lower extremities of said descending tubes and extending along the wiping portion of the applicator, said last named tubes having discharge openings distributing insecticide to the wiping portion of the flexible applicator.

4. In combination in an insecticide distributor, a frame, an applicator of flexible sheet material mounted in the opening thereof and including absorbent wiping means along the lower part thereof for applying insecticide to a passing animal, an insecticide reservoir, and conduit means from the reservoir for delivering insecticide directly to said wiping means, said conduit means including flexible tubes extending substantially parallel with the lower edge of the wiping means and having openings for distributing insecticide to the wiping means.

5. In combination in an insecticide distributor, a frame, an insecticide reservoir, flexible sheet wiping means extending across the frame opening to apply insecticide to a passing animal, flexible conduit means receiving insecticide from the reservoir and suspended vertically within the frame opening, and flexible horizontal conduit means connected to the lower part of said suspended conduit means, said flexible wiping means being carried by said horizontal flexible conduit means, said horizontal conduit means having openings therealong for distributing insecticide to the wiping means.

6. In combination in an insecticide distributor, a frame, an applicator disposed in the opening thereof, said applicator having a wiping pad attached to its lower edge, flexible conduit means descending along the applicator and receiving insecticide from the reservoir, and flexible conduit means extending horizontally along the lower part of the applicator and receiving insecticide from said descending conduit means, said horizontal conduit means having delivery openings therealong, said wiping pad extending upward beyond its point of attachment to the applicator and having its upper portion supported by said horizontal conduit means to lie in close proximity to said horizontal conduit means and receive insecticide from said openings.

7. The combination according to claim 6 in which said applicator is of double thickness and said conduit means and the upper portion of the wiping pad lie between the folds thereof.

8. In combination in an insecticide distributor, a frame, an applicator suspended within the opening of said frame to apply insecticide to a passing animal, and yielding means connected to the vertical sides of the applicator at points above the lower edge of the applicator for restraining forward movement of the upper part of the applicator.

9. In combination in an insecticide distributor, a frame, an applicator suspended within the opening of said frame to apply insecticide to a passing animal, and resilient means connecting the vertical sides of the applicator to the frame, at a point midway of the length of the applicator, said resilient means restraining forward movement of the upper part of the applicator and leaving the lower part free to bear upon and swing against the animal's body.

10. In combination in an insecticide distributor, a frame, and an applicator suspended within the frame opening for applying liquid insecticide to a passing animal, said applicator being folded transversely to form a vertical plait, the upper parts of the inner folds of the plait being refolded outwardly upon the applicator.

11. In combination in an insecticide distributor, a frame, and an applicator suspended within the frame opening for applying liquid insecticide to a passing animal, said applicator being folded transversely to form a vertical plait, the upper parts of the inner folds of the plait being refolded outwardly upon the applicator along lines convergent downwardly to form lapels.

12. In combination in an insecticide distributor, a frame, and an applicator suspended within the frame opening for applying liquid insecticide to a passing animal, said applicator being transversely folded to form a vertical plait, the side portions of the applicator descending to a lower point than the central portion thereof, and resilient means connected to the sides of the applicator for restraining forward movement of the upper part of the applicator while leaving the lower part free, said elongated side portions being thereby free to swing inwardly under the passing animal.

13. In combination in an insecticide distributor, a frame having an opening for the passage of an animal, an insecticide reservoir, an applicator of flexible sheet material adapted to be moved by the passing animal and to freely conform to the shape thereof, said flexible applicator being supported at its upper edge to depend across the opening in said frame, a rock shaft mounted in the frame, means for operating the rock shaft depending therefrom and contacting the opposite faces of the applicator at a level below the upper edge of the same, and means operated by the rock shaft for forcing the insecticide for delivery from the reservoir to the applicator, substantially as described.

14. Apparatus according to claim 13 in which the rockable shaft forms the support for the upper edge of the applicator and for the said operating means contacting the opposite faces of the applicator.

15. In combination in an insecticide distributor, a frame, an applicator of flexible sheet form disposed across the frame opening, said sheet having its side portions extending to a lower plane than its central portion, and wiping means secured to the lower ends of the side and central portions, with the central portion of said wiping means having its lower edge in a plane above the lower edges of the wiping means of the side portions, and weights within the said wiping portions constituting the sole means for applying pressure of the wiping portions to the animal.

16. In combination in an insecticide distributor, a frame having an opening for the passage of an animal, an insecticide reservoir, an applicator of flexible sheet material adapted to be moved by the passing animal and to freely conform to the shape thereof, said flexible applicator being supported at its upper edge to depend across the opening in said frame, a rock shaft mounted in the frame, and means associated with a portion of the flexible applicator below the upper edge of the same to receive movement therefrom, said means being connected with the rock shaft to move the same, and means operated by the rock shaft for forcing the insecticide for delivery from the reservoir to the applicator.

17. In combination, a flexible applicator member mounted to be moved by a passing animal, a rockable member operated by the movement of the applicator, said rockable member being substantially tubular, means providing a chamber disposed within the hollow portion of said rockable member and in communication therewith, a reservoir connected with said rockable member for supplying insecticide liquid to said chamber through said rockable member, a pump operated by the rockable member for delivering the liquid to said rockable member, conduit means depending from said rockable member and in communication with said chamber for delivering insecticide liquid from said chamber to the flexible applicator, and valve means disposed in said chamber and operated by the pressure of the liquid entering the chamber to control the delivery of the liquid from the chamber to the applicator.

18. Apparatus according to claim 17 in which said means providing said chamber comprises a tube disposed transversely through said rockable member, said tube having an opening in its wall communicating said chamber with the hollow of the rockable member.

19. In combination in apparatus of the class described, a frame having an opening for the passage of the animal, a rock shaft journaled in the frame and directly carrying a chamber, an applicator of flexible material suspended from said rock shaft, a reservoir connected with the chamber for supplying insecticide thereto, a valve directly mounted on the rock shaft operated by the pressure of the insecticide and controlling the passage of the insecticide from said chamber to said applicator, and a pump mounted on the frame adjacent one end of the rock shaft and including an element mounted on said rock shaft for forcing the insecticide to said chamber, said connection from the reservoir to the said chamber being through one of the journals of the rock shaft.

NEWTON MANSFIELD.